United States Patent
Watanabe et al.

(10) Patent No.: US 6,999,270 B2
(45) Date of Patent: Feb. 14, 2006

(54) MAGNETIC HEAD AND A MAGNETIC DISK DRIVE

(75) Inventors: Katsuro Watanabe, Kanasago (JP); Takayoshi Ohtsu, Oi (JP); Kouji Kataoka, Odawara (JP); Nobuo Yoshida, Odawara (JP); Kikuo Kusukawa, Yoshikawa (JP)

(73) Assignee: Hitachi, Ltd., Tokyo (JP)

( * ) Notice: Subject to any disclaimer, the term of this patent is extended or adjusted under 35 U.S.C. 154(b) by 134 days.

(21) Appl. No.: 10/699,856

(22) Filed: Nov. 4, 2003

(65) Prior Publication Data
US 2004/0264034 A1    Dec. 30, 2004

(30) Foreign Application Priority Data
Jun. 26, 2003    (JP)    ............................. 2003-181992

(51) Int. Cl.
*G11B 5/596*    (2006.01)
(52) U.S. Cl. ................................... 360/78.04; 360/126
(58) Field of Classification Search ............ 360/78.04, 360/103, 69, 319, 324.2
See application file for complete search history.

(56) References Cited

U.S. PATENT DOCUMENTS

| | | | | |
|---|---|---|---|---|
| 3,855,623 | A * | 12/1974 | Chur et al. ................. | 360/75 |
| 4,809,091 | A * | 2/1989 | Miyazawa et al. ............ | 360/48 |
| 5,305,447 | A * | 4/1994 | Hampshire ................. | 711/112 |
| 5,416,646 | A * | 5/1995 | Shirai ...................... | 360/46 |
| 6,215,301 | B1 * | 4/2001 | Lenssen ................... | 324/252 |
| 6,542,340 | B1 | 4/2003 | Hayashi | |
| 6,643,104 | B1 * | 11/2003 | Shimazawa ................. | 360/319 |
| 6,654,209 | B1 * | 11/2003 | Seigler et al. .............. | 360/322 |
| 6,870,713 | B1 * | 3/2005 | Shimazawa ................. | 360/320 |
| 2002/0030946 | A1 | 3/2002 | Shimazawa | |

FOREIGN PATENT DOCUMENTS

| | | |
|---|---|---|
| JP | 2001-67628 | 9/1999 |
| JP | 2002-25016 | 7/2000 |

OTHER PUBLICATIONS

T. Miyazaki and N. Tezuka, "Giant Magnetic Tunneling Effect in $Fe/Al_2O_3/Fe$ Junction", Journal of Magnetism and Magnetic Materials 139, (1995), pp. L231-L234.

K. Nagasaka, Y. Seyama, L. Varga, Y. Shimizu and A. Tanaka, "Giant Magnetoresistance Properties of Specular Spin Valve Films in a Current Perpendicular to Plane Structure", Journal of Applied Physics, vol. 89, No. 11, Jun. 1, 2001, pp. 6943-6945.

* cited by examiner

*Primary Examiner*—K. Wong
(74) *Attorney, Agent, or Firm*—Reed Smith LLP; Stanley P. Fisher, Esq.; Juan Carlos A. Marquez, Esq.

(57) ABSTRACT

The CPP structure magnetoresistive head has a structure such that a first lead line is electrically connected to a lead contact portion attached to a lower shield layer the width of which is either equal to or shorter than the maximum length of the lower shield layer in the track direction, or the height of which is either equal to or shorter than the maximum length of the lower shield layer in the stripe height direction. With the structures above, it is possible to prevent that a bump is generated on the upper shield layer by the first lead line, and that a magnetic domain is formed by the bump, which is a cause of noise generation. Further, it is possible to avoid overlapping between the lead line and the upper shield layer.

23 Claims, 16 Drawing Sheets

MAGNETIC HEAD AND A MAGNETIC DISK DRIVE

BACKGROUND OF THE INVENTION

1. Field of the Invention

The present invention relates to a magnetic head having a structure of CPP (Current perpendicular to the plane), which allows a sense current to flow perpendicular to a stacking plane of magnetoresistive films, and a magnetic disk drive on which the magnetic head above is mounted.

2. Discussion of the Background

Recently, recording density of a magnetic disk drive is made higher at a phenomenal rate, such as at an annual growth rate of 100%. With such enhancement in recording density, a high output magnetic head is required to be mounted on the magnetic disk drive.

In order to achieve such a high output magnetic head, performance of a magnetoresistive film is being enhanced. Up to the recording density of around $3\times10^8$ bits per 1 $cm^2$, an anisotropic magnetoresistive (AMR) film has been used. However, for a recording density equal to or higher than the value above, a giant magnetoresistive (GMR) film was developed and it has been improved until now. Even with the giant magnetoresistive film, there is a concern that the output may be insufficient for the recording density higher than $9.3\times10^9$ bits per 1 $cm^2$. Therefore, following films have been researched and developed as a next-generation magnetoresistive film subsequent to the GMR film: Tunneling magnetoresistive (TMR) film as described in "Journal of Magnetism and Magnetic Materials", issued in 1995, vol. 139, pp. L231 to L234, and CPP (Current perpendicular to plane)-GMR film, which allows a current to flow perpendicular to a stacking plane of GMR films, as described in "Journal of Applied Physics", issued in 2001, vol. 89, pp. 6943 to 6945.

Here, it is to be noted that there is a large difference in structure between the magnetic head which employs AMR film or GMR film, and the magnetic head which employs TMR film or CPP-GMR film. The former has a structure of CIP (Current into the plane) to allow a sense current to pass through into the in-plane direction of the plane of the magnetoresistive film comprising AMR film or GMR film, and leads for supplying the sense current are provided on both sides of the magnetoresistive film. On the other hand, the latter has a structure of CPP (Current perpendicular to the plane), which allows the sense current to flow approximately in perpendicular direction with respect to the film surface of the magnetoresistive film comprising TMR film or CPP-GMR film. With this structure, the leads are required to be provided in stacked manner on the magnetoresistive film. Accordingly, as to the leads and a lead line for leading the sense current to the leads, it is necessary to contrive a new structure, which is different from the magnetic head of CIP structure.

Regarding a structure of the leads and the lead line in the CPP structure, Japanese Patent Application Laid-open No. 2001-67628 discloses that an entire upper lead layer exists extendedly within an area where a lower lead layer is formed in a plane view. Japanese Patent Application Laid-open No. 2002-25016 discloses a structure where the lead line electrically connected with the upper shield layer is patterned so that an area of the lead line located above the lower shield layer becomes small.

SUMMARY OF THE INVENTION

Japanese patent application laid-open No. 2001-67628 discloses a structure that in order to avoid electrical short-circuits between an upper electrode layer and a lower electrode layer, the entire upper electrode layer is formed above the lower electrode layer, when viewed from the upper side of the substrate. Therefore, the electrical short-circuits with the upper electrode at the edge of the lower electrode layer can be avoided.

Japanese patent application laid-open No. 2002-25016 discloses a structure for improving a frequency dependent performance at the time of high data transfer, by making the lead line finer, which is disposed on the lower electrode layer.

For the CPP structure, it is required to solve a new problem which has not been found in the case of CIP structure, due to a substantial request for allowing a sense current to flow perpendicular to a stacking plane of a magnetoresistive film. The problem is, due to the leads or the lead line, a bump is generated on a shield layer, in particular, on an upper shield layer, and then a magnetic domain originates on the shield and it causes a noise.

In the case of the CIP structure, since the leads are formed on both sides of the magnetoresistive film, that is, prepared on a same layer. Therefore, even if bumps are generated, they are held in symmetry with respect to the magnetoresistive film, within the upper shield layer.

On the other hand, in the case of the CPP structure, it is necessary to provide the leads vertically, that is, above and below the magnetoresistive film. Therefore, the lower lead line and the upper lead line have to be prepared in different layers, and thus bumps in asymmetry are held with respect to the magnetoresistive layer within the upper shield layer. Accordingly, unstable magnetic domain occurs in the upper shield layer, causing a noise due to the shield.

In addition, in order to-increase the data transfer rate of the magnetic disk device, it is required to reduce capacitance C of the magnetic head. For that purpose, in the case of CPP structure head, an area where the upper and lower shield layers are opposed to each other should be smaller. On the other hand, in order to suppress an increase of the head resistance, the area of a part where the shield layer and the lead line are connected cannot be made smaller. Therefore, with respect to the area of the entire shield, a proportion of the area for a contact portion with the lead line is raised. Accordingly, magnetization of the shield layer becomes particularly vulnerable to influence of a bump by the lead line or a stress generated by forming the lead line or a protective layer. Therefore, it is hard to obtain stability in reproducing operation.

Conventional arts as described above have not referred to such problems.

An objective of the present invention is to provide a magnetoresistive device having a noiseless and stable reproducing performance, with a high yield, in a CPP structure magnetoresistive head to which CPP type magnetoresistive film is applied. Further, by achieving-the high yield by the low noise, it is possible to provide a magnetic disk drive attaining low cost and high performance.

In order to achieve the above objectives, the magnetic head and the magnetic disk drive relating to the present invention mainly features that a lower shield layer has a lower lead contact portion within a same plane, the lower lead contact portion is positioned where it is not overlapped by an upper shield layer, when the upper shield layer is projected onto the plane where the lower shield layer exists, and a first lead line is connected to the lower lead contact portion.

In other words, the above objective can be achieved by providing a magnetic head comprising an upper shield layer, a lower shield layer on which a lead contact portion is provided on the edge of the lower shield layer in a stripe height direction within a same plane, the lead contact portion having a width either being equal to or shorter than a maximum length of the lower shield layer in a track width direction, a magnetoresistive sensor which is formed between the upper shield layer and the lower shield layer, a first lead line which is electrically connected to the lead contact portion of the lower shield layer, and a second lead line which is electrically connected to the upper shield layer, wherein, when the upper shield layer is projected on a plane where the lower shield layer exists, the lead contact portion of the lower shield layer is provided in a position not overlapped by the upper shield layer, and a sense current flows through the upper shield layer, the magnetoresistive sensor and the lower shield layer.

Here, the objective can also be achieved when the lead contact portion of the lower shield layer, to which the first lead line is electrically connected, has a height either being equal to or shorter than the maximum length of the lower shield layer in the stripe height direction, and the lead contact portion is positioned on the edge in the track width direction of the lower shield layer.

Similar to the lower shield layer, another structure may be possible, that is, as to the upper shield layer, a lead contact portion which has a width either being equal to or shorter than the maximum length of the upper shield layer in the track width direction, is provided on the edge in the stripe height direction, and the lead contact portion is electrically connected to the second lead line. Further, another structure may be possible, that is, a lead contact portion having a height either being equal to or shorter than the maximum length in the stripe height direction is provided on the edge in the track width direction, and the lead contact portion is electrically connected to the second lead line.

It is to be noted that the lead contact portion may be composed of a material same as that of the shield layer, but a different material may be used. Preferably, a material having a resistivity lower than that of the shield layer may constitute the lead contact portion.

DETAILED DESCRIPTION OF THE PREFERRED EMBODIMENTS

Hereinafter, preferred embodiments of the present invention will be explained in detail, with reference to the attached drawings.

EXAMPLE 1

Figure 1:
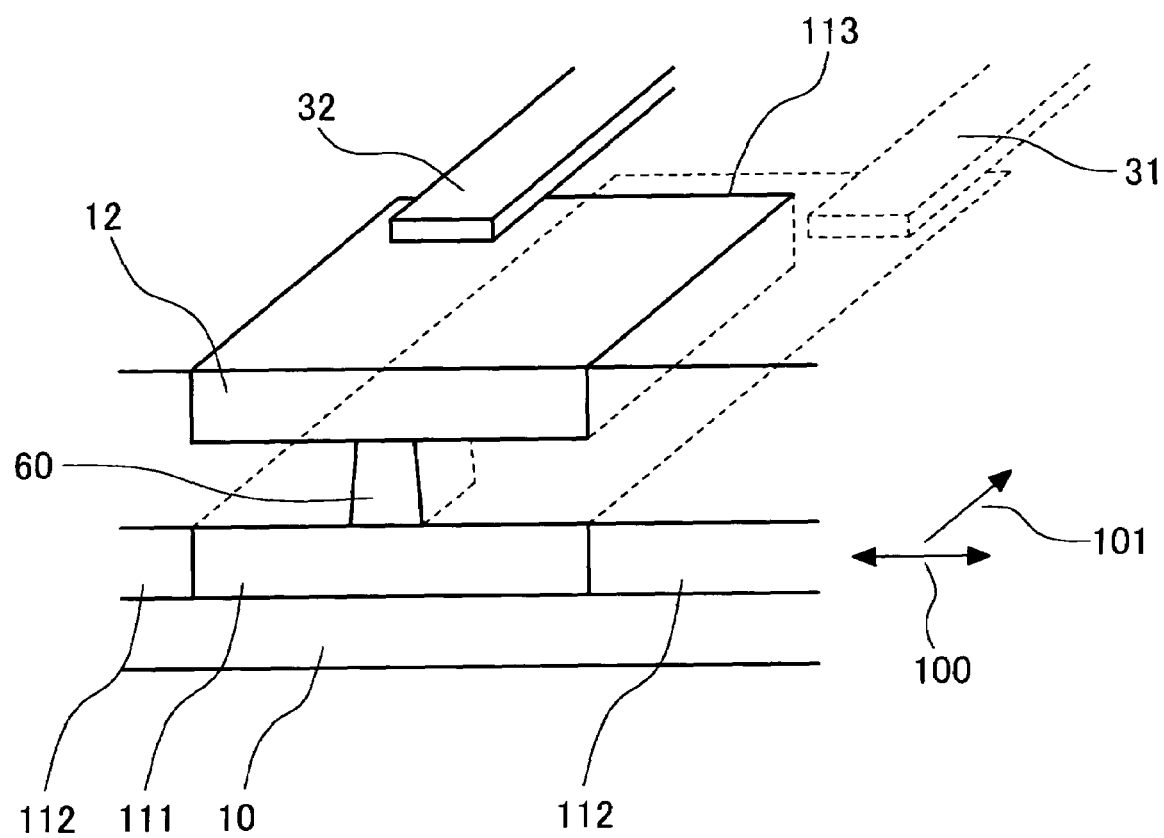
FIG. 1 is an overhead view showing a CPP structure magnetoresistive head of one embodiment of the present invention.

FIG. 1 shows an overhead view of a read head of a magnetoresistive head relating to the present invention. It is to be noted that FIG. 1 shows a status where a step for forming an upper shield layer and connecting a second lead line thereto has been completed. It is an overhead view from a plane on which a device is formed, into a stripe height direction, and even with the overhead view, portions which are invisible due to other layers are indicated with broken lines.

A film of Ni—Fe alloy is formed by plating on $Al_2O_3$—TiC substrate 10, whose surface has been coated with an insulating material such alumina, and then it is patterned to be a predetermined shape. Then, an alumina film is formed thereon and subjected to planarization by chemical mechanical polishing (CMP), so as to form a lower shield layer 111 and a lower alumina layer 112. A first lead line 31 is formed in such a manner as electrically connected with a back portion of the lower shield layer 111 in the stripe height direction.

Figure 2:
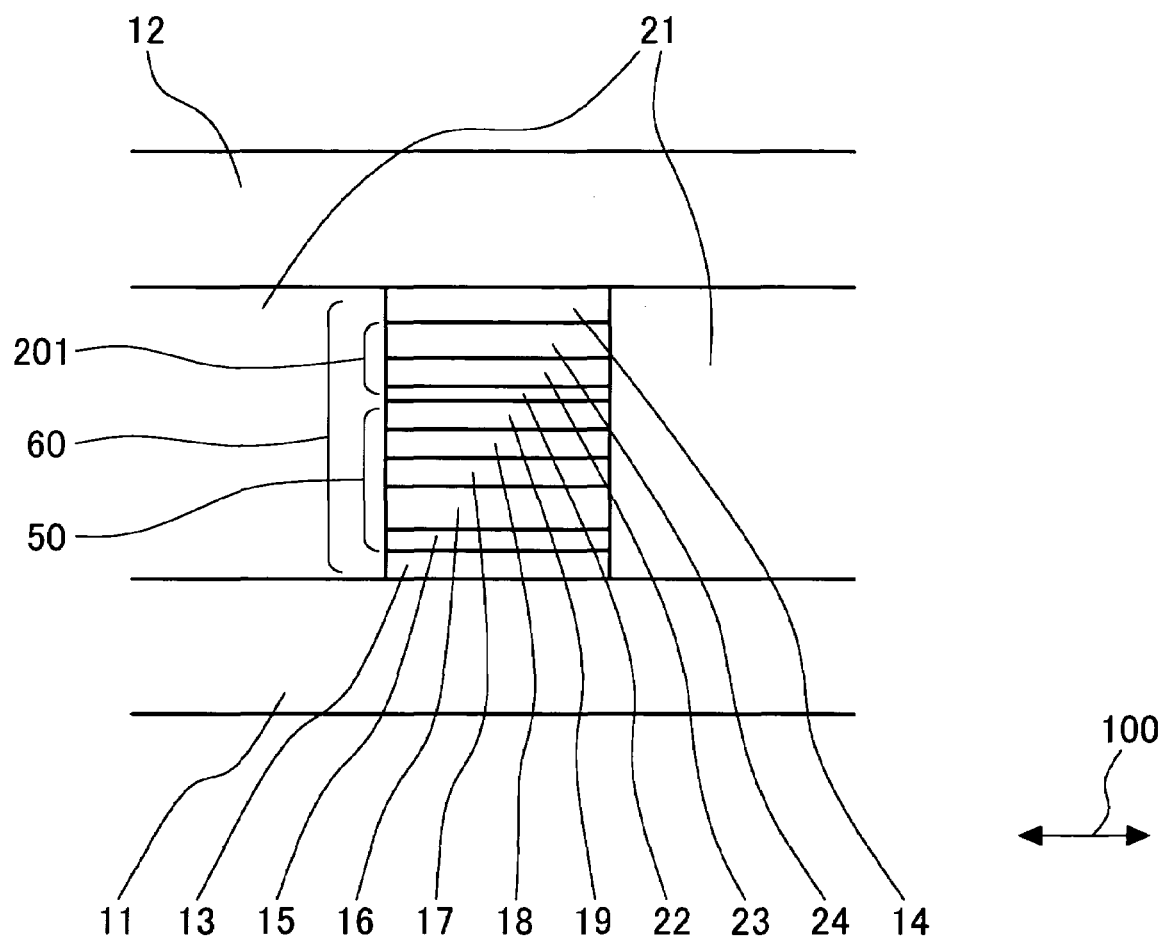
FIG. 2 shows a structure of a magnetoresistive film of CPP structure magnetoresistive head of Example 1 of the present invention.
Figure 3:
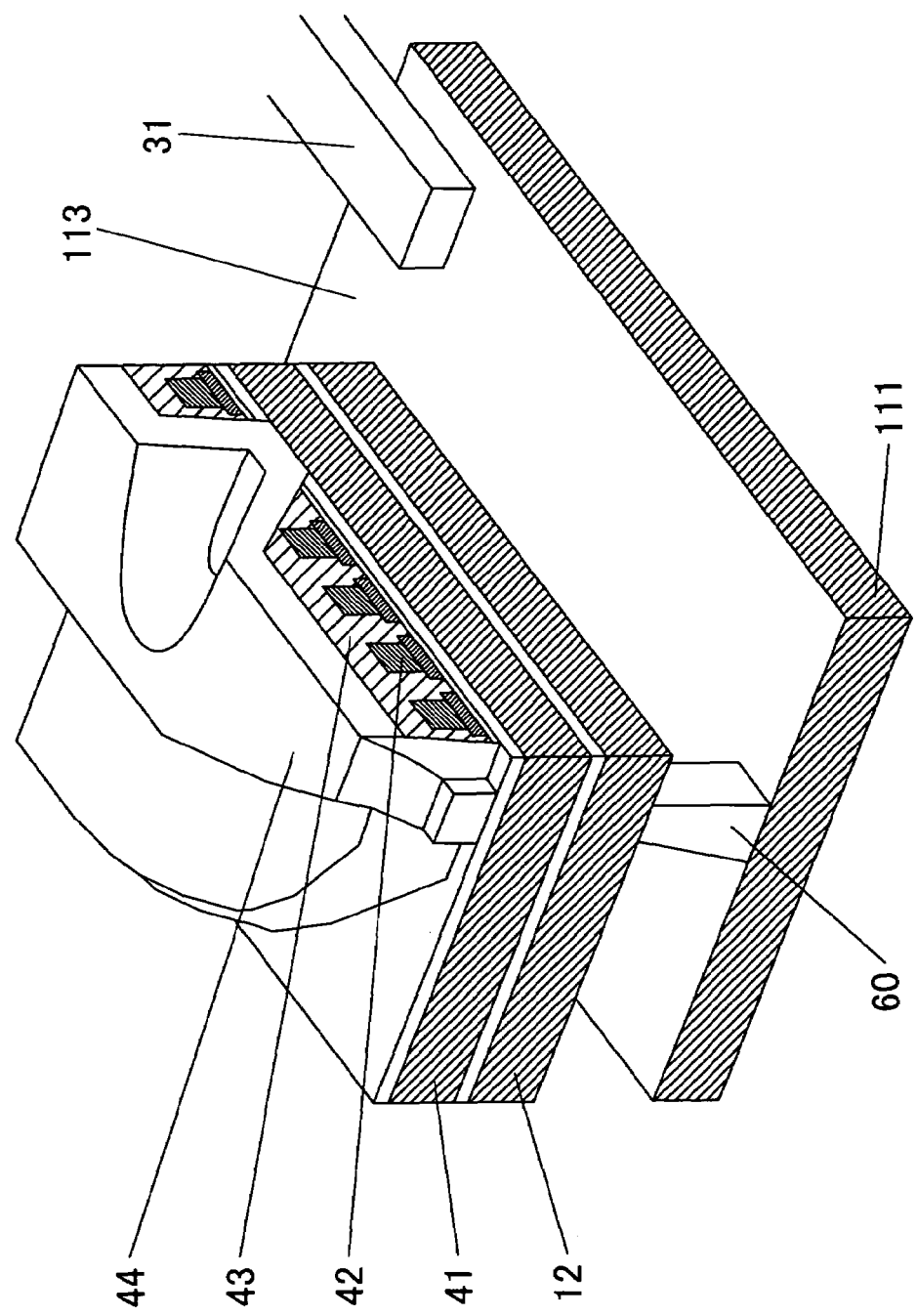
FIG. 3 is an overhead view and a partial sectional view showing the magnetic head of Example 1.

Here, the width of the portion of the lower shield layer 111, where the first lead line 31 is connected is equal to the width of the lower shield layer 111 in the track width direction. A protective film is formed on the lower shield layer 111, so that the first lead line 31 is not etched in the subsequent steps. Then, a surface of the lower shield layer 111 is subjected to cleaning within equipment for forming a CPP type magnetoresistive film 60, and then the CPP type magnetoresistive film 60 is formed as shown in FIG. 2.

That is, a film of tunneling magnetoresistive film 50 is firstly formed, which comprises a lower gap layer 13 composed of Mo, for example, a seed layer 15 composed of a metal for controlling the orientation of stacked films formed thereon, for example, 81 at. % Ni −19 at. % Fe, an antiferromagnetic layer 16 composed of 52 at. % Pt −48 at. % Mn, a second ferromagnetic layer 17 composed of 75 at. % Co −25 at. % Fe, a tunneling barrier 18 composed of aluminum oxide, and a first ferromagnetic layer 19 composed of 81 at. % Ni −19 at. % Fe. Subsequently, a longitudinal biasing layer 201 is laminated thereon, which comprises an underlayer for a longitudinal biasing layer 22 composed of, for example, Cu, Ta, Ru, or stacked films thereof, a soft magnetic layer 23 for longitudinal biasing composed of, for example, Ni—Fe alloy, Co—Fe alloy, Fe or stacked films thereof, and a pinning layer 24 for longitudinal biasing composed of, for example, Mn—Ir system antiferromagnetic layer or Co—Cr—Pt system hard magnetic layer. Then, an upper gap layer 14 is further laminated thereon.

In order to generate an exchange coupling between the antiferromagnetic layer 16 and the second ferromagnetic layer 17, thus obtained CPP type magnetoresistive film is subjected to an annealing in the magnetic field at 250° C. for six hours, while a magnetic field of 3 kOe is applied in the stripe height direction. Then, at a position of a sensing region which detects a magnetic field from a recording medium, a lift-off mask is formed. Then, the CPP type magnetoresistive film other than the sensing region is subjected to etching by ion milling method.

After the insulating film 21 is formed and the lift-off mask is removed, the upper shield layer 12 composed of Ni—Fe alloy is formed. The second lead line 32 is provided on the back position in the stripe height direction of the upper shield layer 12, which is a position where the first lead line 31 is not arranged.

Here, the length of the upper shield layer 12 in the track width direction is approximately equal to that of the lower shield layer 111. However, the length in the stripe height direction is shorter than that of the lower shield layer 111, and the upper shield layer 12 is positioned so that it does not exist above the first lead line 31.

Further, a separation layer is formed to separate a write head from a read head, and then, a lower pole 41, a coil 42, interlayer insulating film 43, an upper pole 44, a protective film and the like are formed to constitute the write head. After the write head formation is completed, annealing at 250° C. for three hours is carried out while applying the magnetic field of 500 Oe in the track width direction. Subsequently, the orientation for magnetizing the first ferromagnetic layer 19 is placed toward the track width direction, while maintaining the orientation for magnetizing the second ferromagnetic layer 17 approximately to the stripe height direction. Then, a wafer process of the magnetic head is completed.

Next, a backend process is carried out as described in the following. The wafer is cut off to obtain a bar where a plurality of magnetic heads are arranged. Then, it is lapped by a mechanical polishing until its height becomes a desired stripe height, by use of a lapping tool. A protective film is formed for protecting the read/write head on an air bearing surface. Further, in order to control the distance (flying height) between the magnetic head and the magnetic disk, a predetermined groove is formed on the air bearing surface by the ion milling method, dry etching method and so on. Subsequently, the bar is cut off by device to obtain a slider. The slider is connected to a supporting component, thereby completing the magnetic head.

Figure 4:
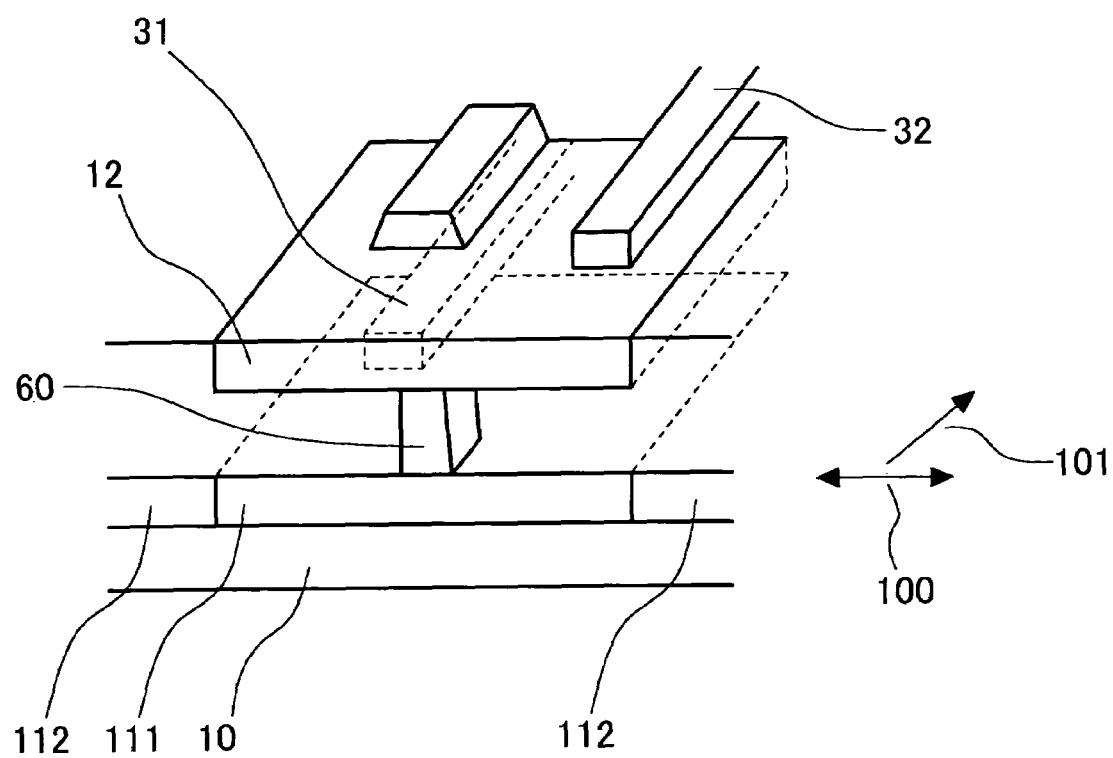
FIG. 4 is an overhead view of a conventional CPP structure magnetoresistive head.

For a comparison purpose, another magnetic head is prepared, having the lower shield layer 111 of same size as the upper shield layer 12 as shown in FIG. 4, and then, a transfer curve of the slider has been measured. Examples of the transfer curves regarding the present invention and the comparative example are respectively shown in FIG. 5 and FIG. 6. In the Figures, the horizontal axis represents an applied magnetic field (Oe) and the longitudinal axis represents an output voltage ($\mu$V). As a matter of convenience for the measuring equipment, it is set such that resistance value becomes larger in the negative applied magnetic field.

Figure 5:
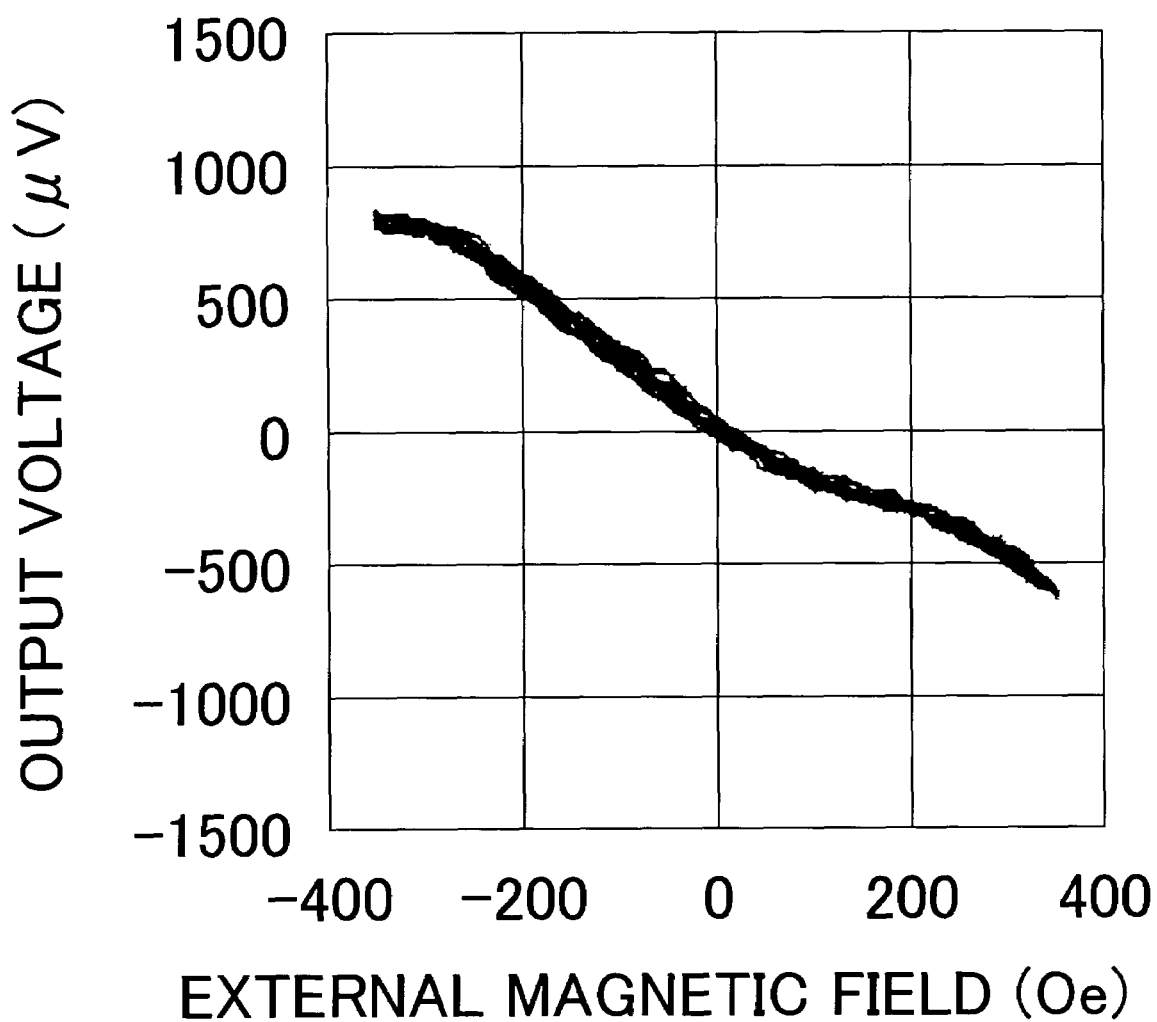
FIG. 5 is a transfer curve of the CPP structure magnetoresistive head of the present invention.
Figure 6:
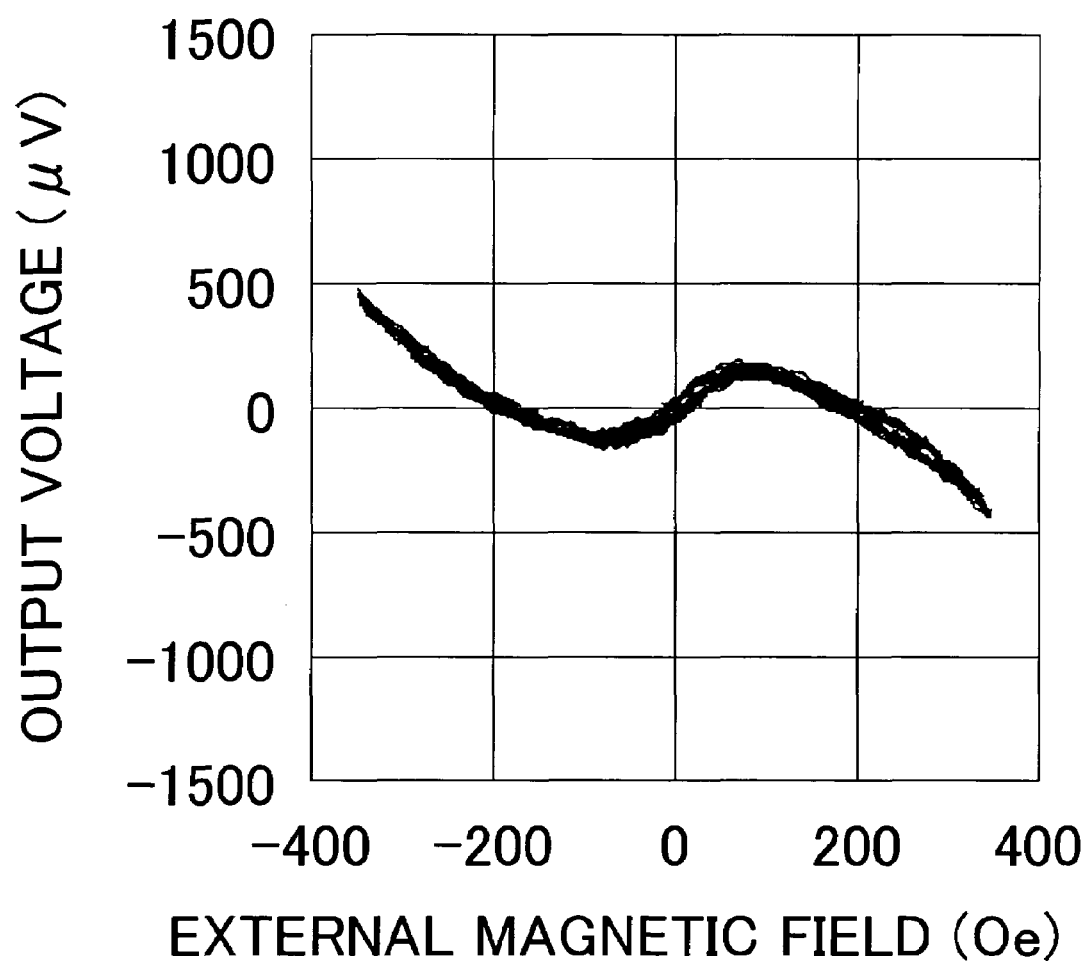
FIG. 6 is a transfer curve of the conventional CPP structure magnetoresistive head.

As shown in FIG. 5, in the magnetic head of the present invention, a normal operation is seen such that the transfer curve changes approximately linearly with respect to the magnetic field. On the other hand, in the magnetic head of the comparative example as shown in FIG. 6, the transfer curve shows an irregular undulation of the resistance value deviating from a linear change, in the range between −70 Oe and 70 Oe. Also, it is found that in the comparative example, an absolute value of the output voltage of the magnetic head is only around two-thirds of that of the present invention. Further, 420 pieces of magnetic heads are measured for each case to obtain a ratio indicating a normal operation, the magnetic head of the present invention shows 99%, whereas it is only 7% in the comparative example. Therefore, it has been concluded that the yield of the magnetic head of the present invention is extremely high.

A conceivable cause for the result above is that in case of comparative example, due to the first lead line 31 connected to the lower shield layer 111, a bump is generated on the upper shield layer 12, whereby a magnetic domain originates. Then, a magnetic field generated by the magnetic wall motion of the upper shield layer may have affected a magnetization rotation of the magnetoresistive film.

Figure 7:
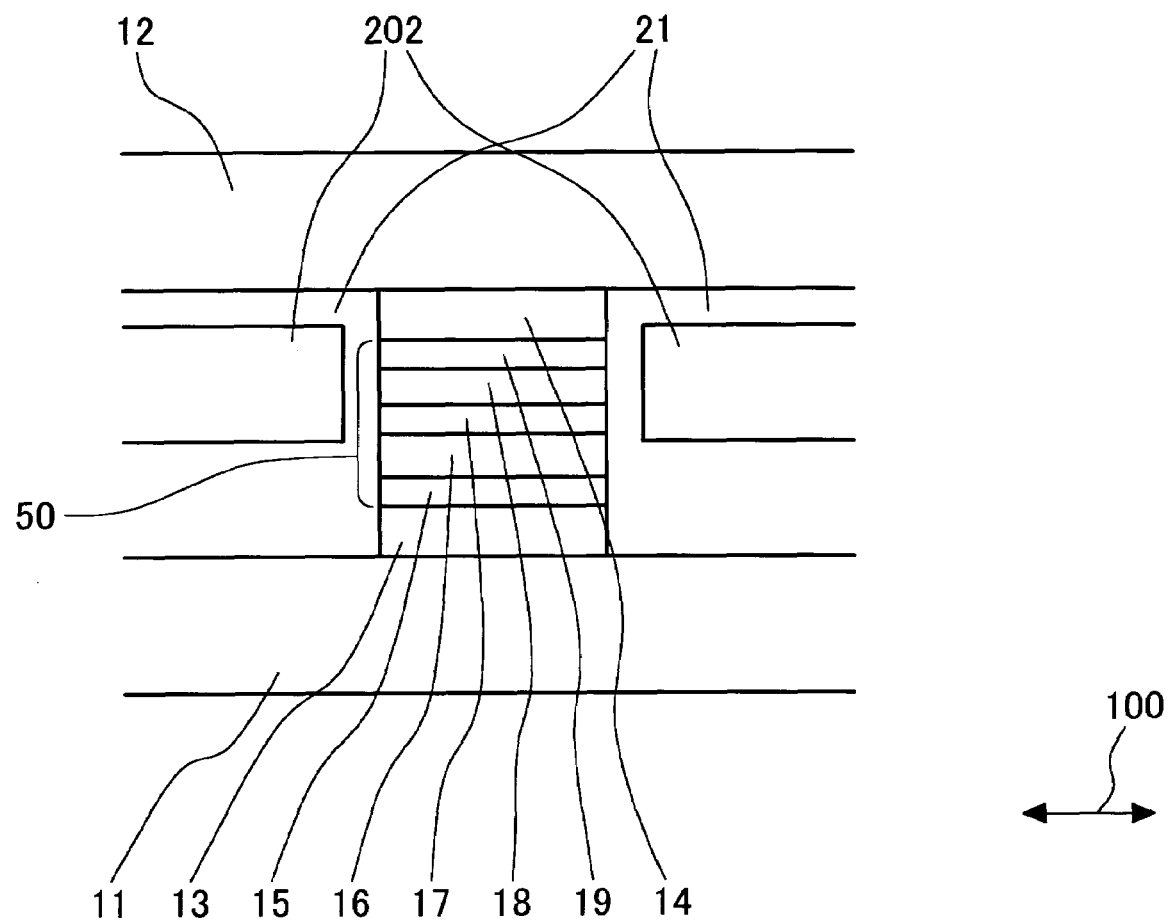
FIG. 7 shows a structure of magnetoresistive film of the CPP structure magnetoresistive head having a different longitudinal biasing method of the present invention.

In the embodiment of the present invention, a stacked longitudinal biasing structure has been described, which has been obtained by stacking the tunneling magnetoresistive layer 50 and the longitudinal biasing layer 201. However, as shown in FIG. 7, the present invention shows a same effect even in a structure, so called abutted junction type longitudinal biasing structure. In the abutted junction type longitudinal biasing structure, the longitudinal biasing layers 202 are arranged on both sides of the tunneling magnetoresistive film 50, via insulating layers, the longitudinal biasing layer being obtained by stacking an underlayer composed of Cr, for example, and a hard magnetic film having a large coercivity, such as Co—Cr—Pt system alloy.

Further, as a way of example of the magnetoresistive film, the tunneling magnetoresistive film 50 having the tunneling barrier 18 has been explained. Instead of the tunneling magnetoresistive film, following CPP-GMR films may be employed: a CPP-GMR film in which a metallic conductive layer is used instead of the tunneling barrier 18, a CPP-GMR film on which a mixed layer composed of high resistive portions and electrical conductive portions for narrowing down a path for the sense current is provided in a part of stacked structure of the film so as to increase resistance, or a CPP-GMR film on which a high polarization material, such as Heusler alloy or magnetite, is used as a part of the first ferromagnetic layer 19 or the second ferromagnetic layer 17 so as to obtain high-output.

Figure 8:
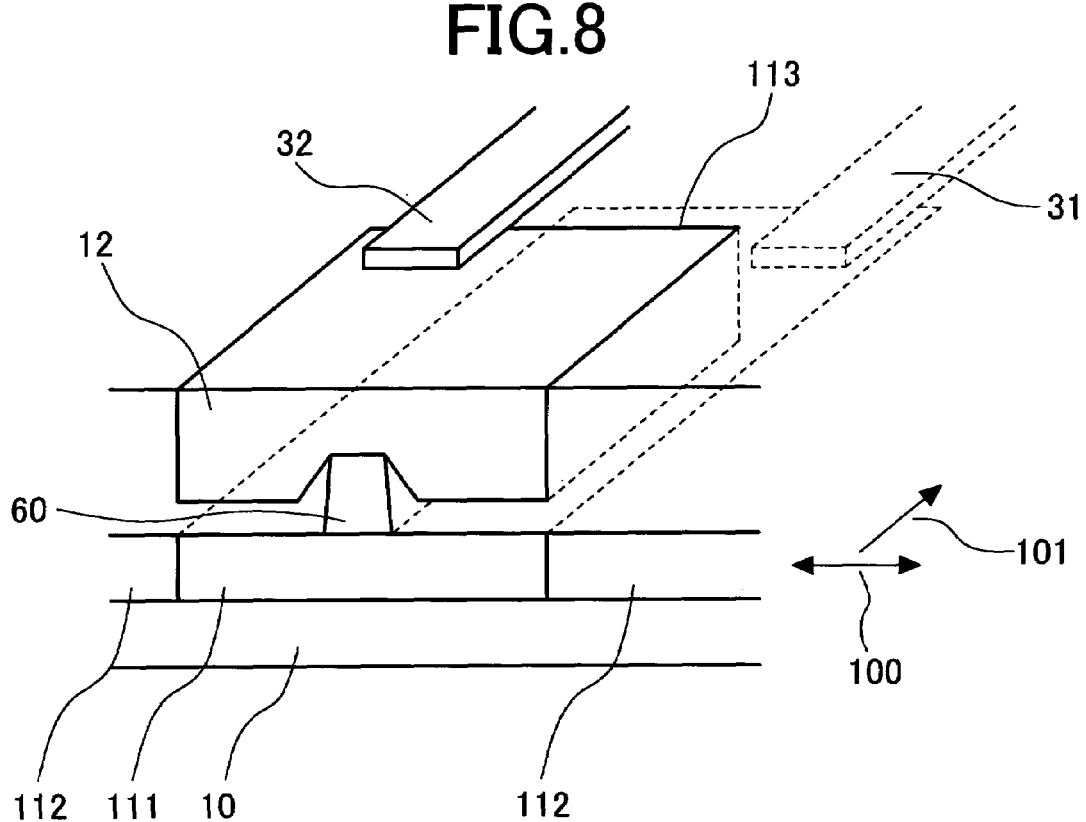
FIG. 8 is an overhead view of the CPP structure magnetoresistive head having a different shield shape of the present invention.

It is to be noted that in order to achieve a high recording density, it is necessary to reduce an impact of the magnetic stray field, which is leaked from an adjacent track. Therefore, the present invention can also be applied to a structure as shown in FIG. 8, which is suitable for the above object. Specifically, it is a structure where the shield layer is disposed also at both sides of the CPP type magnetoresistive layer 60, more accurately, the first ferromagnetic layer 19, whose magnetization is rotated by the magnetic field from a recording medium.

EXAMPLE 2

Figure 9:
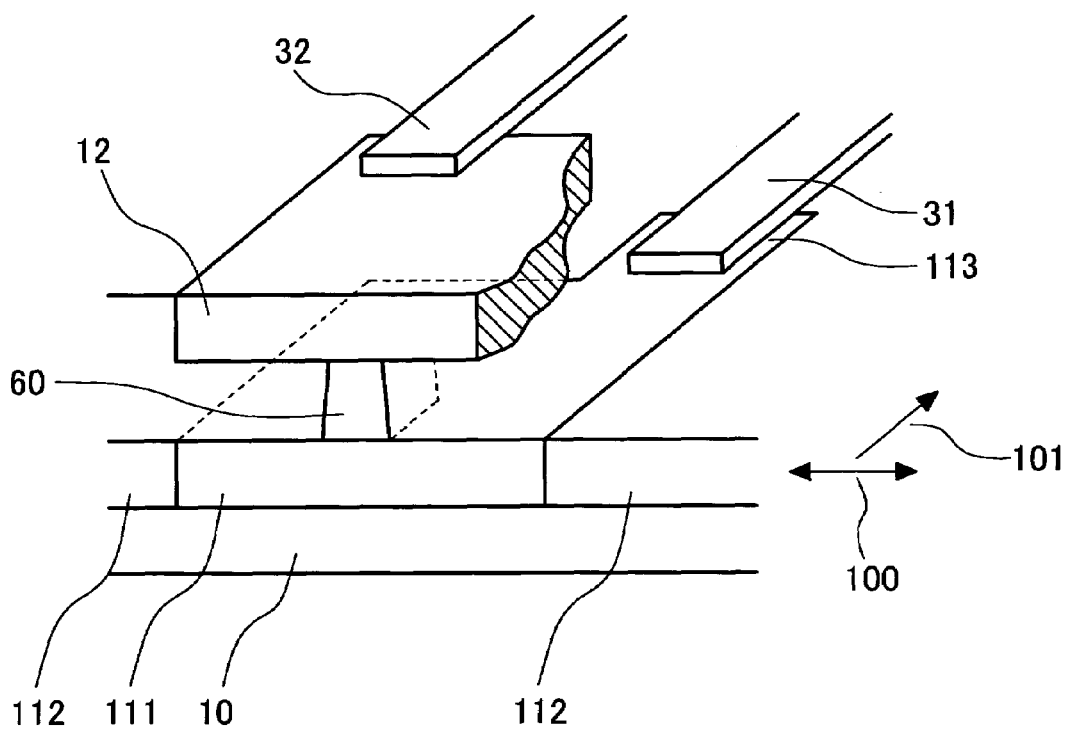
FIG. 9 is an overhead view and a partial sectional view showing the CPP structure magnetoresistive head of Example 2 of the present invention.
Figure 10:
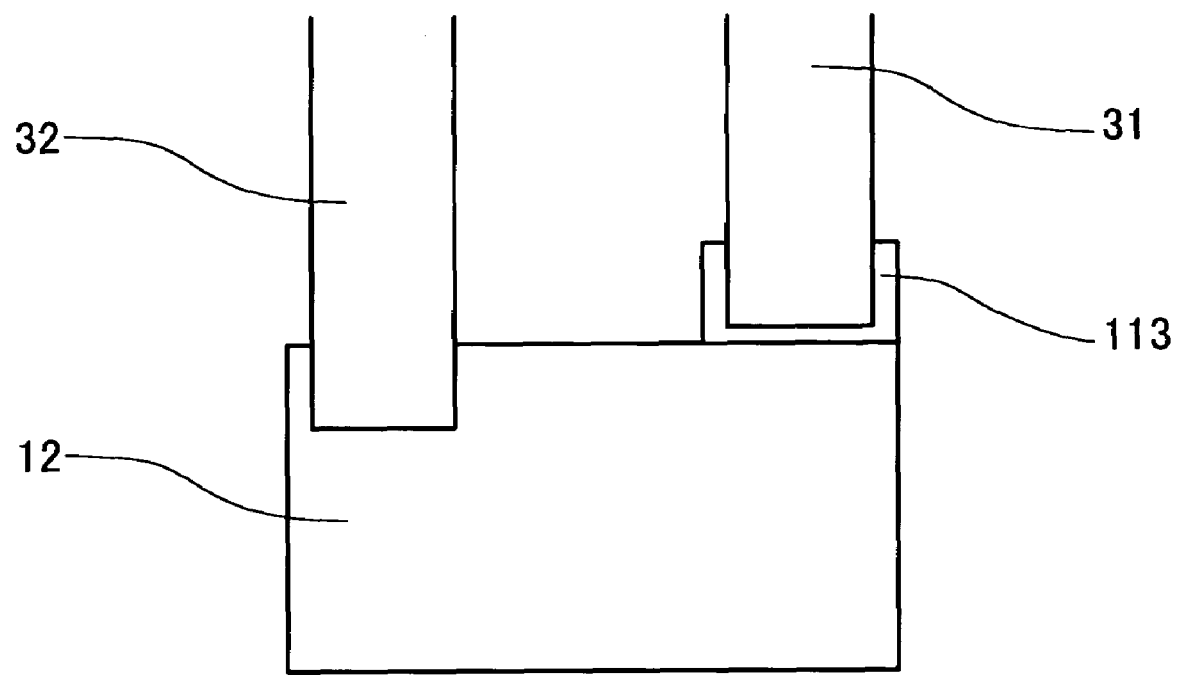
FIG. 10 is a diagram showing an arrangement of the shield layers and lead lines projected on a plane where the lower shield layer is disposed, regarding the CPP structure magnetoresistive head of Example 2 of the present invention.

FIG. 9 and FIG. 10 show a structure of a read head relating to another embodiment of the present invention. FIG. 9, in the left side, is a diagram looking down upon the read head from a plane where a magnetoresistive sensor is formed into a stripe height direction, and for explanation purpose, the upper shield layer 12 is cut off in the right side of FIG. 9, so as to clarify a positions of the lower shield layer 111 and the first lead line 31. FIG. 10 shows an arrangement of the shield layers and the lead lines, which is projected from the upper of the device fabricated plane onto a plane where the lower shield layer 111 is disposed.

As indicated in FIG. 9, at the edge parallel to the track width direction of the lower shield layer 111, a lead contact portion 113 having a width shorter than the length of the lower shield layer 111 in the track width direction is provided. At the lead contact portion 113, the first lead line 31 is electrically connected to the lower shield layer 111.

With the structure above, the first lead line 31 is not positioned below the upper shield layer 12, whereby a bump is not generated on the upper shield layer 12.

Further, with the first lead line 31 thus formed, a stress is acted on the lower shield layer. Even if a magnetic domain originates due to the stress, a magnetic domain wall is pinned on the boundary between the lower shield layer 111 and the lead contact portion 113 attached to the lower shield layer 111, a noise is not generated during a reproducing operation.

As obvious from FIG. 10, there is not a portion where the lower shield layer 111 and the second lead line 32 are directly opposed, and thus it is possible to reduce capacitance C, which occurs when the lower shield layer 111 and the second lead line 32 serve as opposed electrodes.

EXAMPLE 3

Figure 11:
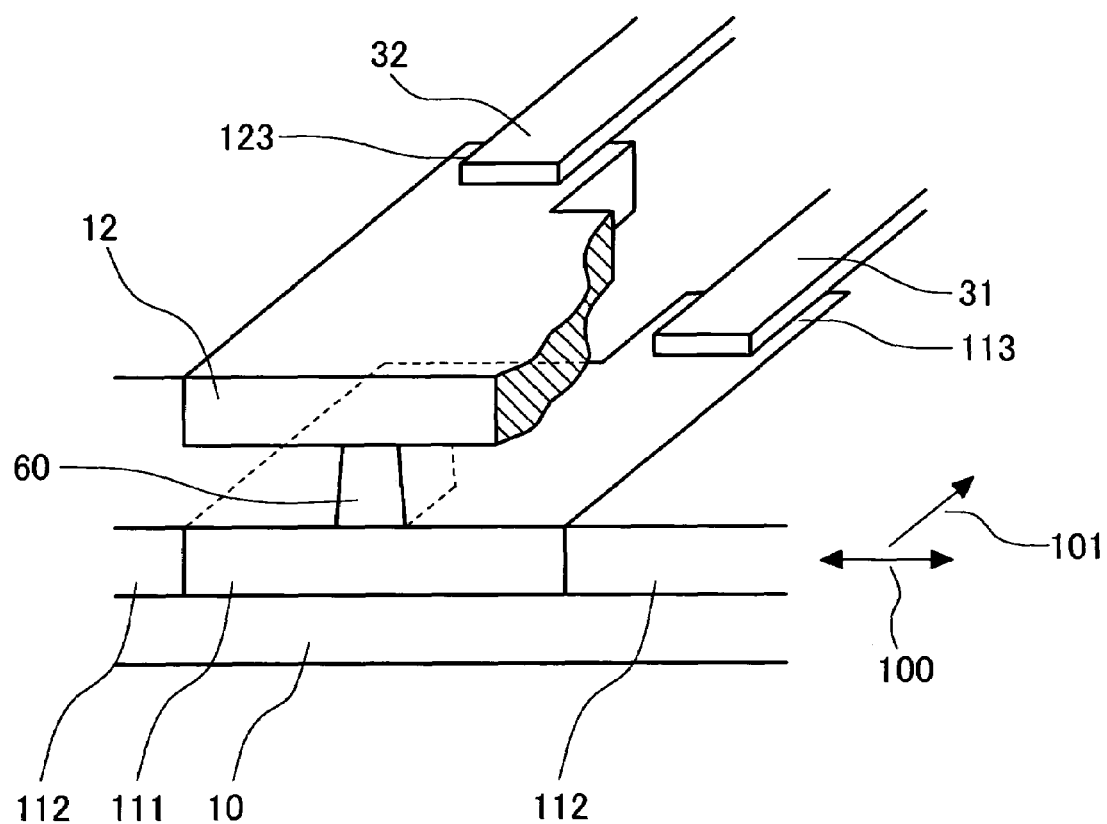
FIG. 11 is an overhead view and a partial sectional view showing the CPP structure magnetoresistive head of Example 3 of the present invention.
Figure 12:
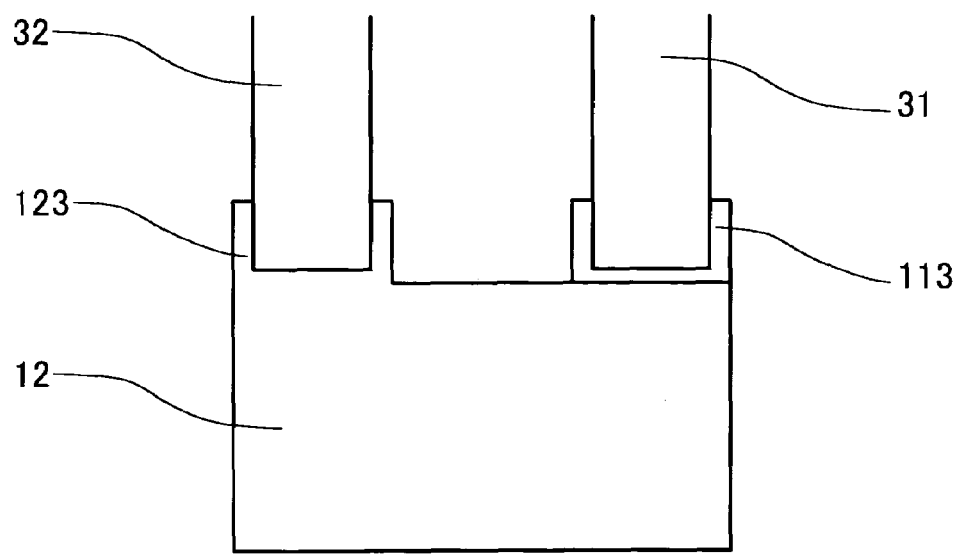
FIG. 12 is a diagram showing an arrangement of the shield layers and lead lines projected on a plane where the lower shield layer is disposed, regarding the CPP structure magnetoresistive head of Example 3 of the present invention.

FIG. 11 is an overhead view of the read head portion of another embodiment of the present invention. In the right side of FIG. 11, the upper shield layer 12 is cut off, so as to clarify positions of the lower shield layer 111 and the first lead line 31. FIG. 12 shows an arrangement of the shield layers and the lead lines, which are projected from the upper of the device fabricated plane onto a plane where the lower shield layer 111 is disposed.

A structure of the present embodiment is that on the edge parallel to the track width direction of the upper shield layer 12, a lead contact portion 123 having a width shorter than the length of the upper shield layer 12 in the track width direction is provided. At the lead contact portion 123, the second lead line 32 is electrically connected with the upper shield layer 12. In this structure, even if a stress is acted on the upper shield layer 12 by disposing the lead line 32 on the upper shield layer 12, and a magnetic domain originates on the upper shield layer due to the stress, the magnetic domain wall is pinned at the boundary with the contact portion attached to the upper shield layer 123, and an impact by the magnetic domain on the reproducing operation can be limited within the lead contact portion attached to the upper shield layer 123. This is an advantage of Example 3 in addition to that of the Example 2.

EXAMPLE 4

Figure 13:
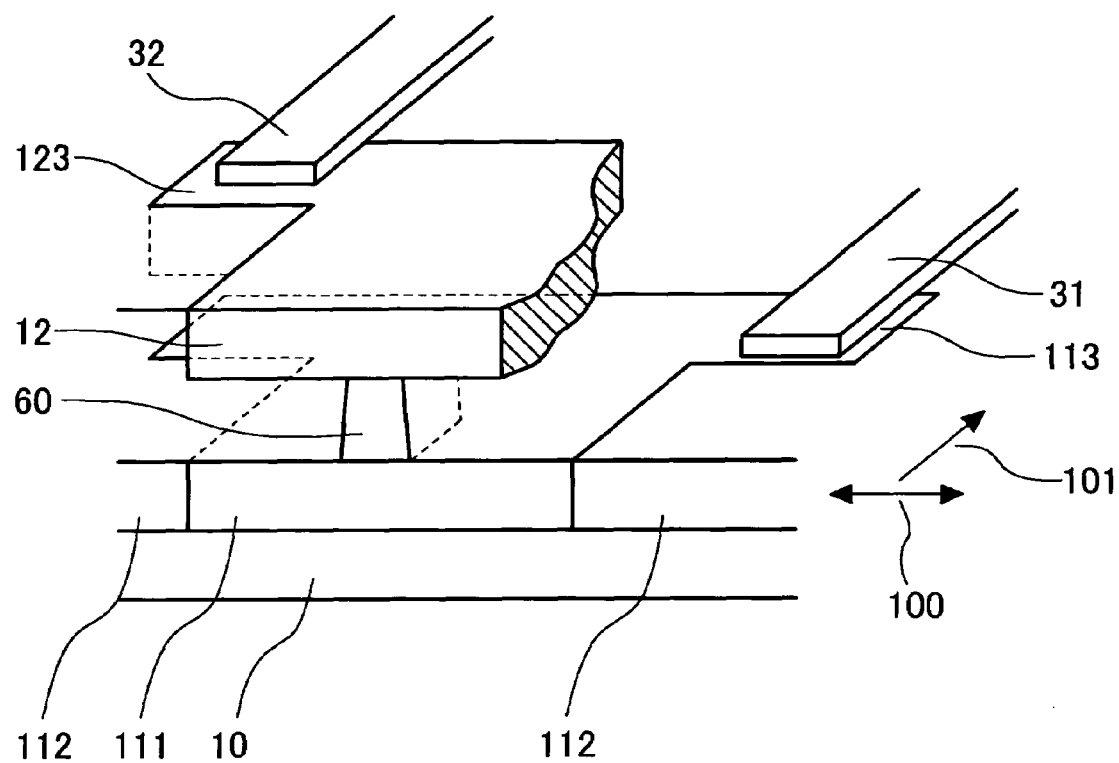
FIG. 13 is an overhead view and a partial sectional view showing the CPP structure magnetoresistive head of Example 4 of the present invention.
Figure 14:
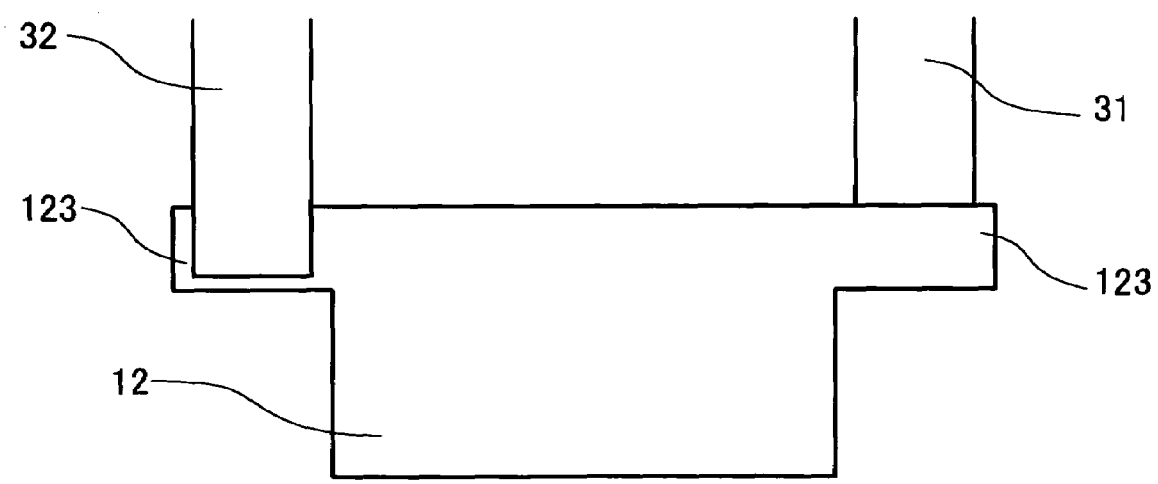
FIG. 14 is a diagram showing an arrangement of the shield layers and lead lines projected on a plane where the lower shield layer is disposed, regarding the CPP structure magnetoresistive head of Example 4 of the present invention.

In the above Examples 1 to 3, there are described structures where a lead contact portion attached to the shield layer and connected to a lead line is provided on the edge parallel to the track width direction of the shield layer. The Example 4 shows a structure where the lead contact portion attached to the shield layer is provided on the edge perpendicular to the track width direction of the shield layer. FIG. 13 is an overhead view and a partial overhead view when the upper shield layer 12 is cut off. FIG. 14 is a diagram in which the lower shield layer 111, the first lead line 31, the upper shield layer 12 and the second lead line 32 are projected onto the plane on which the lower shieldlayer 111 is disposed.

On the both edges perpendicular to the track width direction of the lower shield layer 111, a lead contact portion 113 is disposed having a height shorter than the height in the stripe height direction of the lower shield layer 111. At the lead contact portion 113, the first lead line 31 is electrically connected with the lower shield layer 111. Further, on the both edges perpendicular to the track width direction of the upper shield layer 12, a lead contact portion 123 is disposed having a height shorter than the height in the stripe height direction of the upper shield layer 12, and at the lead contact portion 123, the second lead line 32 is electrically connected with the upper shield layer 12.

The above structure is advantageous when it is required to make shorter the height in the stripe height direction of the shield layer, for a purpose such as reducing the capacitance. If the height in the stripe height direction of the shield layer is made shorter in a structure where the lead contact portion attached to the shield layer and connected with the lead line is provided on the edge parallel to the track width direction of the shield layer, the magnetic field from the recording medium reaches the lead contact portion, and there is a possibility that the magnetic domain wall existing on the boundary between the lead contact portion and the shield layer may be moved. Therefore, it is concerned that more noise may occur comparing to the case where the height in the stripe height direction of the shield layer is longer.

In such a case as describe above, if the lead contact portion attached to the shield layer and connected with the lead line is provided on the edge perpendicular to the track width direction, no magnetic substance exists between the lead contact portion and the air bearing surface. Therefore, it is possible to reduce the magnetic field acting upon the lead contact portion. Further, since the boundary between the lead contact portion attached to the shield layer and the shied layer is parallel to the direction of the magnetic field from the recording medium, the impact of the magnetic field from the recording medium hardly acts, even when a magnetic domain wall exists on the boundary between the lead contact portion attached to the shield layer and the shield layer. With these reasons, it is possible to suppress a noise occurrence.

Further, by forming the first lead line 31, a stress acts upon the lower shield layer, and by forming the second lead line 32, a stress acts upon the upper shield layer. Even when magnetic domains originate on the lower shield layer and the upper shield layer due to the stress, the magnetic domain walls are pinned on the boundary between the lower shield layer and the lead contact portion attached to the lower shield layer, and on the boundary between the upper shield layer and the lead contact portion attached to the upper shield layer. Therefore, a noise is not generated during a reproducing operation.

EXAMPLE 5

Figure 15:
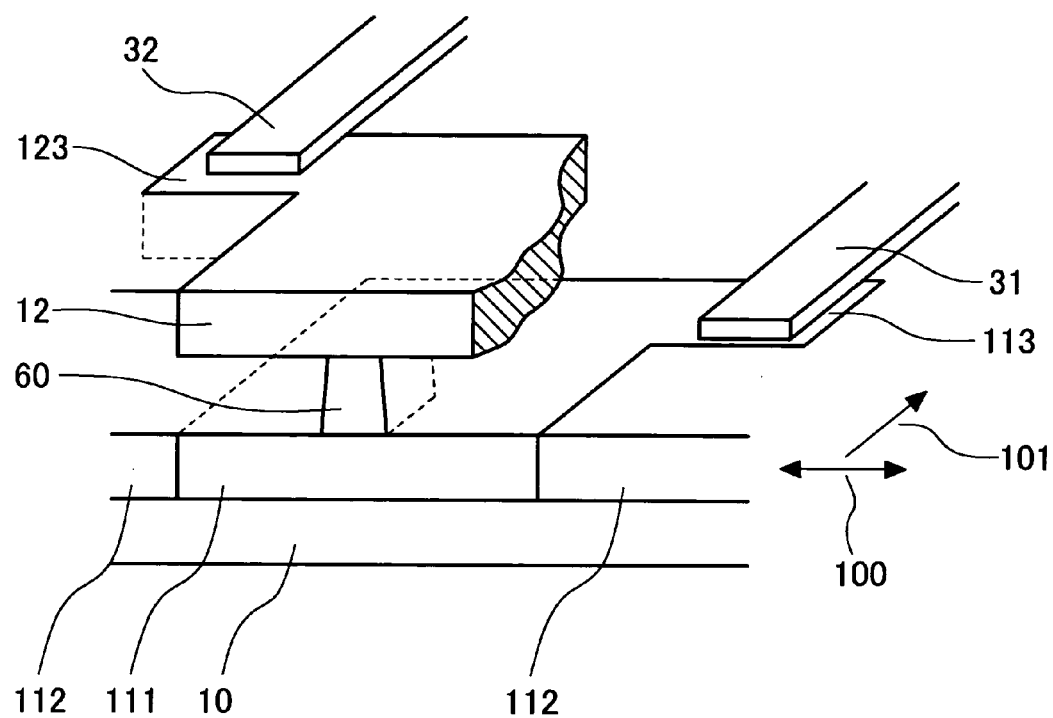
FIG. 15 is an overhead view and a partial sectional view showing the CPP structure magnetoresistive head of Example 5 of the present invention.
Figure 16:
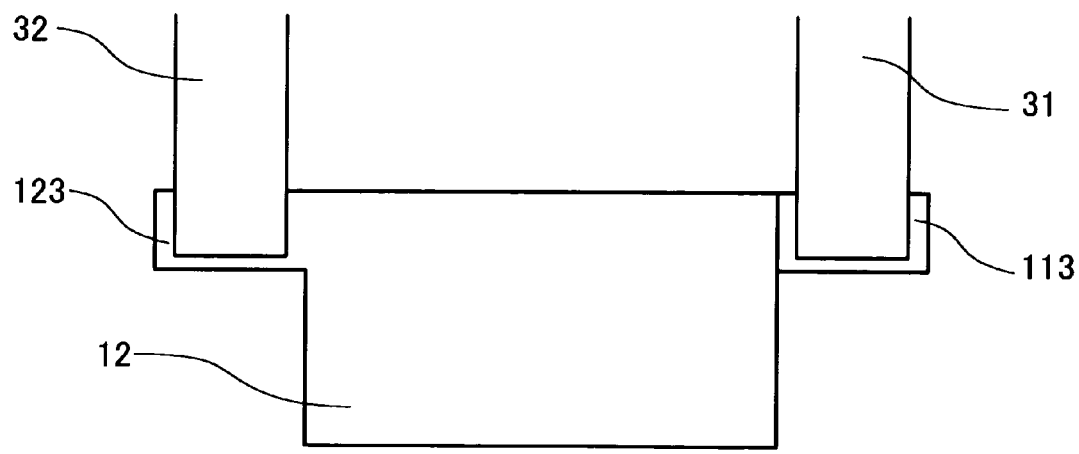
FIG. 16 is a diagram showing an arrangement of the shield layers and lead lines projected on a plane where the lower shield layer is disposed, regarding the CPP structure magnetoresistive head of Example 5 of the present invention.

In the Example 4, the lead contact portion 123 attached to the upper shield layer 12 overlaps the first lead line 31 and the lead contact portion 113 attached to the lower shield layer 111, thereby forming capacitance C. FIG. 15 and FIG. 16 show structures with which the capacitance C thus generated can be reduced.

In this structure, the lead contact portion 113 attached to the lower shield layer 111 and the lead contact portion 123 attached to the upper shield layer 12 are arranged on the edges perpendicular to the track width direction of the shield layer in such a manner as not overlapped by each other. With this arrangement, the upper shield layer 12 and its lead contact portion 123 does not overlap the first lead line 31, and further, the second lead line 32 does not overlap the lower shield layer 111 and its lead contact portion 113. Therefore, it is possible to reduce the capacitance C.

Figure 17:
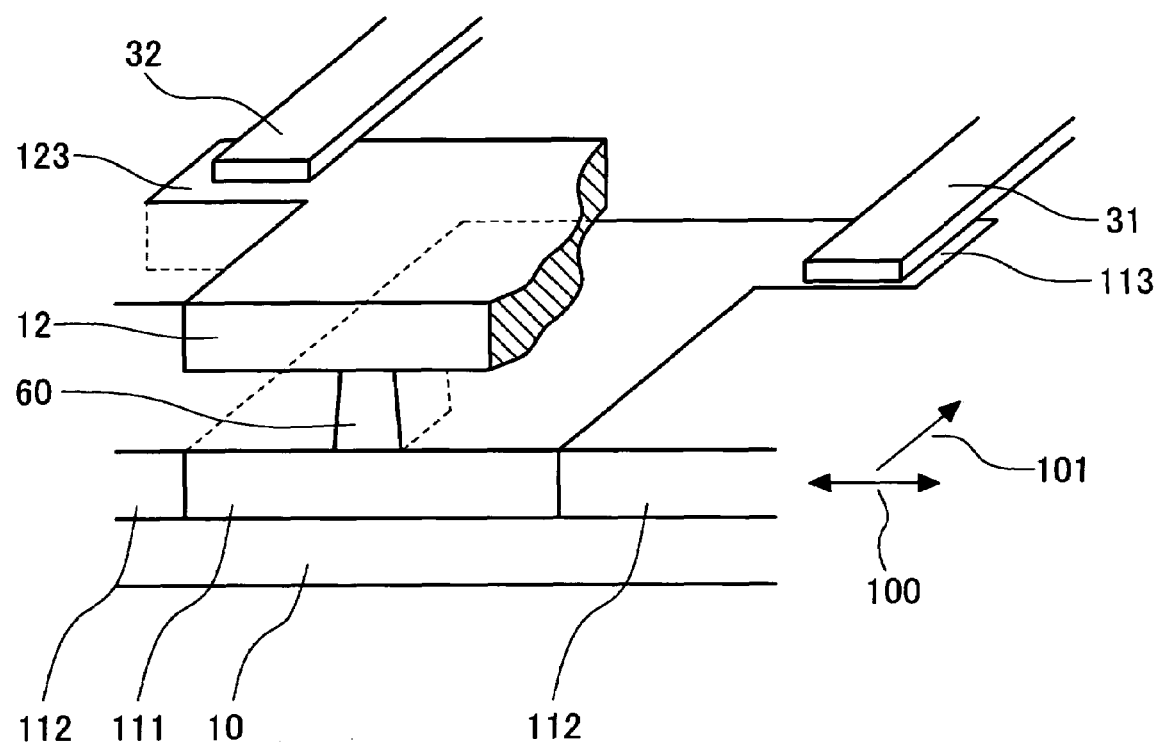
FIG. 17 is an overhead view and a partial sectional view showing the CPP structure magnetoresistive head having a different shape as to the lower shield layer of Example 5 of the present invention.
Figure 18:
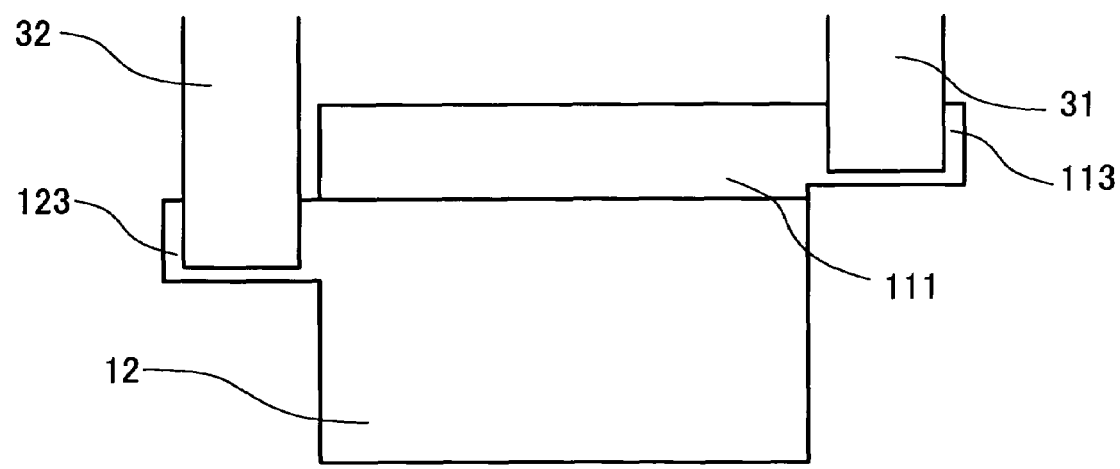
FIG. 18 is a diagram showing an arrangement of the shield layers and lead lines projected on a plane where the lower shield layer having a different shape is disposed, regarding the CPP structure magnetoresistive head of Example 5 of the present invention.
Figure 19:
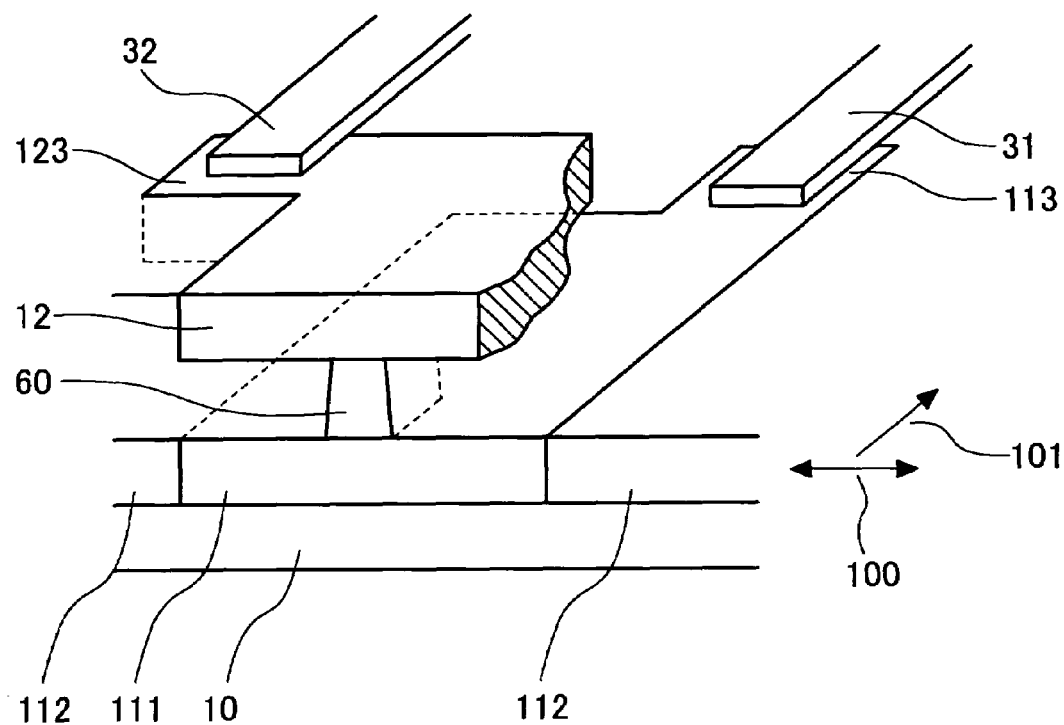
FIG. 19 is an overhead view and a partial sectional view showing the CPP structure magnetoresistive head having a different shape as to the lower shield layer of Example 5 of the present invention.
Figure 20:
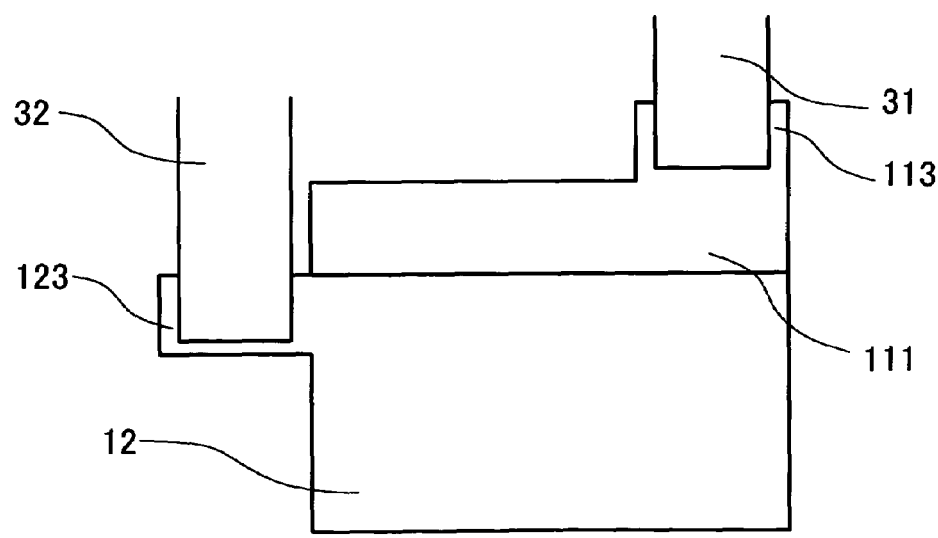
FIG. 20 is a diagram showing an arrangement of the shield layers and lead lines projected on a plane where the lower shield layer having a different shape is disposed, regarding Example 5 of the present invention.

As shown in FIG. 17 and FIG. 18, reduction of the capacitance C can also be achieved by elongating the lower shield layer 111 in the stripe height direction, rather than the height of the upper shield layer 12. Similarly, as shown in FIG. 19 and FIG. 20, it is also achieved by providing one lead contact portion attached to the edge parallel to the track width direction of one shield layer, and providing the other lead contact portion attached to the edge perpendicular to the track width direction of another shield layer. In this case, in order to suppress the noise occurrence as much as possible, it is preferable to provide the lead contact portion on the edge parallel to the track width direction as for the shield layer which is longer in the stripe height direction.

Further, by forming the first lead line 31, a stress acts on the lower shield layer and by forming the second lead line 32, a stress acts on the upper shield layer. Even when magnetic domains originate on the lower shield layer and the upper shield layer due to the stress, the magnetic domain walls are pinned on the boundary between the lower shield layer and the lead contact portion attached to the lower shield layer, and on the boundary between the upper shield layer and the lead contact portion attached to the upper shield layer. Therefore, a noise is not generated during a reproducing operation.

Figure 21:
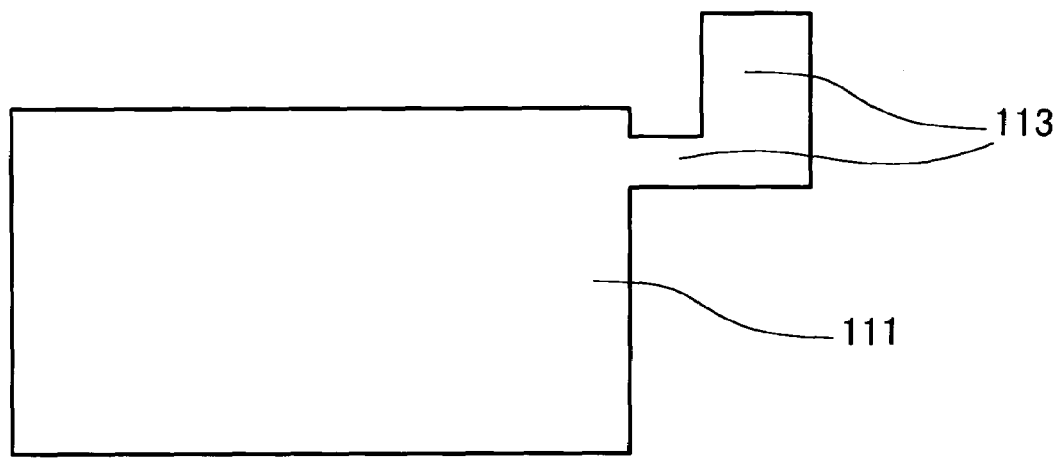
FIG. 21 shows a shape of other shield layers and lead contact portions of the present invention.
Figure 22:
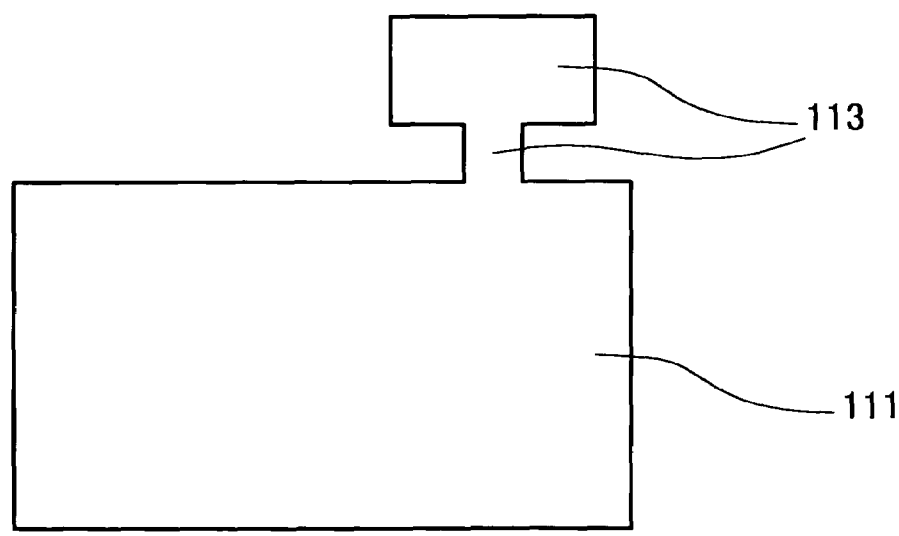
FIG. 22 shows a shape of another lead contact portion of the present invention attached to a shield layer.

It is to be noted that in the figures as explained in the Examples above, the lead contact portion attached to the shield layer and connected with the lead line is shown in a quadrangle shape (approximately convex shape). However, this is a particular example of the present invention, and the shape may be polygonal shape as shown in FIG. 21 or FIG. 22.

The edges of shield layers attached to the lead contact portions are disposed parallel or perpendicular to the track width direction. However these are particular examples of the present invention, and the edges of shield layers may incline from parallel or perpendicular to the track width direction. And these edges are not necessary to be straight lines and may be curved lines.

For ease of understanding, in the Figures, when a lead contact portion attached to the shield layer is provided on the edge parallel to the track width direction, it is positioned at outermost edge in the track width direction, and when it is provided on the edge perpendicular to the track width direction, it is positioned at utmost back in the stripe height direction. However, it is not necessary to restrict the positions, and as far as the first lead line 31 and the second lead line 32 are not overlapped, the positions can be arbitrary determined.

Further, the first lead line 31 and the second lead line 32 are arranged respectively in the right side and left side in the Figures, but it is possible to change places.

As for the material of the lead contact portion attached to the shield layer, it may be same as that constituting the shield layer, or may be different material. As shown in FIG. 21 and FIG. 22 where the lead contact portion is made in wedge shape, it is necessary to avoid resistance increase in a portion where the line width becomes finer. Therefore, it is preferable to employ a single-layer film of a material such as Cu, Au, Cu—Al alloy, which is lower in electrical resistance than that of the material constituting the shield layer, or a multi-layer film including as a part a layer of such material.

The materials for constituting the lower shield layer 11, the upper shield layer 12, the CPP type magnetoresistive layer 60, and the first lead line 31 and the second lead line 32 are also particular examples of the present invention. When other materials having similar features are employed, same effects of the present invention may be obtained.

As for the CPP type magnetoresistive film 50, explanations have been made mainly with the tunneling magnetoresistive layer having a layer of tunnel barrier. However, same effects of the present invention may be obtained even if it is replaced by other magnetoresistive layer which allows a sense current to flow perpendicular to the stacking plane, such as CPP-GMR film using CPP-GMR effect, CPP-GMR film further provided with a current confined layer or high polarization material layer, or a magnetic semiconductor.

Further, as a spacer of the magnetoresistive layer, a nonmagnetic conductive layer may be employed as a way of example. Moreover, as a spacer of the magnetoresistive layer, a mixture of conductor with oxide, nitride, carbide or fluoride may be employed.

For the purpose of improving asymmetry of a readback waveform, the second ferromagnetic layer 17 may be structured with two ferromagnetic layers coupled antiferromagnetically with each other, via Ru, Ir and like. Further, for the purpose of enhancing the read sensitivity, the first ferromagnetic layer 19 may also be structured by the two ferromagnetic layers coupled antiferromagnetically with each other, via Ru, Ir and the like. Such modifications as described above may not change the effects of the present invention.

Figure 23:
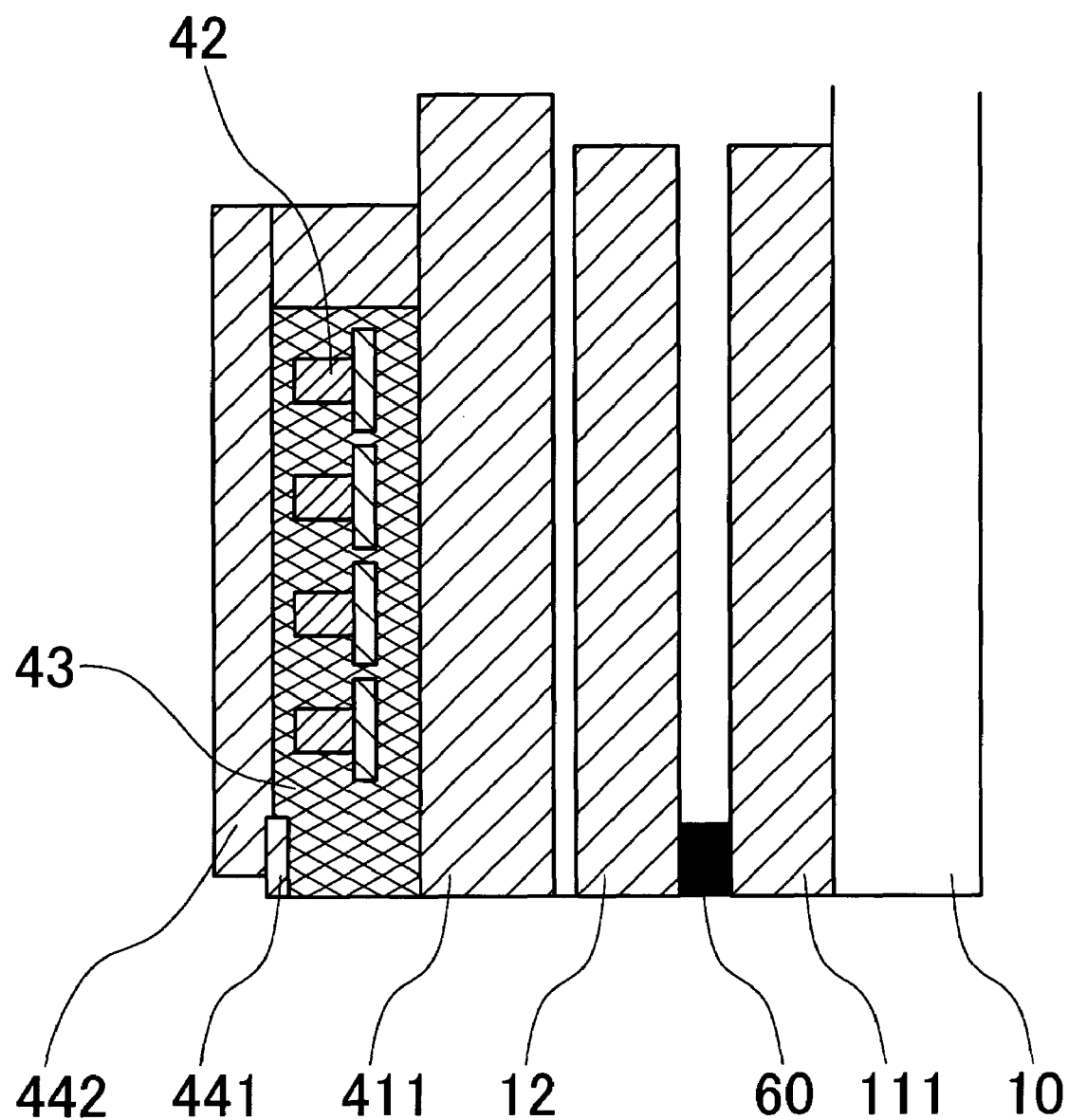
FIG. 23 is a sectional view at a plane including the CPP type magnetoresistive film of the CPP type magnetoresistive head having a single pole type perpendicular writing head of the present invention.

As for the write head, it may be the one which writes into the recording medium by the magnetic field acting upon the write gap between the upper magnetic polar and the lower magnetic polar. When the medium is a perpendicular magnetic recording disk having a soft magnetic underlayer, the write head may be structured such that as shown in the sectional structure of a plane including the CPP type magnetoresistive film of FIG. 23, the write head comprising a main pole 441 and a return pole 411, carries out writing by the magnetic field acting upon between the main pole 441 of the write head and the soft magnetic underlayer of the perpendicular magnetic recording disk.

As described above in detail, according to the present invention, in the magnetoresistive head of CPP structure to which a CPP type magnetoresistive layer is applied, which has a tunneling magnetoresistive effect or CPP-GMR effect, the first lead line 31 is electrically connected to a lead contact portion 113 attached to a lower shield layer 111, within a same plane, the width of the lead contact portion 113 either being equal to or shorter than a maximum length in the track width direction of the lower shield layer 111. Alternatively, the first lead line 31 is electrically connected to a lead contact portion 113 attached to a lower shield layer 111, the height thereof either being equal to or shorter than the maximum length in the stripe height direction of the lower shield layer 111. With the structures above, it is possible to prevent that a bump is generated on the upper shield layer 12 by the first lead line 31, and that a magnetic domain is formed by the bump, which is a cause of noise generation. Therefore, it is possible to supply a magnetic head with less noise.

Further, similar to the case of the first lead line 31, the second lead line 32 may also be structured so that it is electrically connected at the lead contact portion 123 attached to the upper shield layer 12 provided in the upper shield layer 12, whereby it is possible to not only reduce capacitance C, but also reduce noise. Therefore, it is possible to supply a magnetic head with a high yield, superior in high frequency performance.

With the magnetic disk drive as configured above, recorded information can be reproduced by a magnetic head superior in high frequency performance, it is possible to combine with a magnetic disk whose a real recording density per 1 cm$^2$ is at least $9.3 \times 10^9$ bits, and whose linear recording density per 1 cm is at least $25 \times 10^4$ bits.

What is claimed is:

1. A magnetic head, comprising:
an upper shield layer;
a lower shield layer on which a lead contact portion is provided on the edge of the lower shield layer in a stripe height direction within a same plane, the lead contact portion having a width either being equal to or shorter than a maximum length of the lower shield layer in a track width direction;
a magnetoresistive sensor which is formed between the upper shield layer and the lower shield layer;
a first lead line which is electrically connected to the lead contact portion of the lower shield layer; and
a second lead line which is electrically connected to the upper shield layer, wherein
when the upper shield layer is projected on a plane where the lower shield layer exists, the lead contact portion of the lower shield layer is provided in a position not overlapped by the upper shield layer, and sense current flows through the upper shield layer, the magnetoresistive sensor and the lower shield layer.

2. A magnetic head, comprising:
an upper shield layer;
a lower shield layer on which a lead contact portion is provided on the edge of the lower shield layer in a track width direction within a same plane, the lead contact portion having a height either being equal to or shorter than a maximum height of the lower shield layer in a stripe height direction;
a magnetoresistive sensor which is formed between the upper shield layer and the lower shield layer;
a first lead line which is electrically connected to the lead contact portion of the lower shield layer; and
a second lead line which is electrically connected to the upper shield layer, wherein
when the upper shield layer is projected on a plane where the lower shield layer exists, the lead contact portion of the lower shield layer is provided in a position not overlapped by the upper shield layer, and sense current flows through the upper shield layer, the magnetoresistive sensor and the lower shield layer.

3. A magnetic head, comprising:
an upper shield layer;
a lower shield layer;
a magnetoresistive sensor formed between the upper shield layer and the lower shield layer;
a first lead line electrically connected to the lower shield layer;
a second lead line electrically connected to the upper shield layer, and a sense current flows through the upper shield layer, the magnetoresistive sensor and the lower shield layer, wherein
the lower shield layer has a lower lead contact portion within a same plane, the lower lead contact portion is positioned so as not to be overlapped by the upper shield layer, when the upper shield layer is projected on the plane where the lower shield layer exists, and the first lead line is connected to the lower lead contact portion.

4. A magnetic head according to claim 3, wherein
the lower lead contact portion is formed in approximately convex shape on an opposite side of an air bearing surface in the stripe height direction on the lower shield layer.

5. A magnetic head according to claim 4, wherein
the upper shield layer has an upper lead contact portion of approximately convex shape within a same plane.

6. A magnetic head according to claim 5, wherein
the upper lead contact portion is formed on an opposite side of the air bearing surface in the stripe height direction on the upper shield layer.

7. A magnetic head according to claim 5, wherein
the upper lead contact portion is formed on at least one edge in the track width direction on the upper shield layer.

8. A magnetic head according to claim 3, wherein
the lower lead contact portion is formed in approximately convex shape on at least one edge in the track width direction on the lower shield layer.

9. A magnetic head according to claim 8, wherein
the upper shield layer has an upper lead contact portion of approximately convex shape within a same plane.

10. A magnetic head according to claim 9, wherein the upper lead contact portion is formed on an opposite side of an air bearing surface in the stripe height direction on the upper shield layer.

11. A magnetic head according to claim 9, wherein the upper lead contact portion is formed on at least one edge in the track width direction on the upper shield layer.

12. A magnetic head according to claim 3, further comprising
a write head having a main pole and a return pole.

13. A magnetic disk drive, comprising:
a read/write head having a recording head for recording information on a magnetic disk and a reading head for detecting the information recorded on the magnetic disk;
a read/write circuit for sending and receiving a recording signal and a reproducing signal from or to the read/write head;
an actuator means which moves the read/write head to a predetermined position on the magnetic disk; and
a read/write operation control means for controlling the read/write circuit and the actuator means, wherein the read/write head includes a magnetic head comprising:
an upper shield layer;
a lower shield layer on which a lead contact portion is provided on the edge of the lower shield layer in a stripe height direction within a same plane, the lead contact portion having a width either being equal to or shorter than a maximum length of the lower shield layer in a track width direction;
a magnetoresistive sensor which is formed between the upper shield layer and the lower shield layer;
a first lead line which is electrically connected to the lead contact portion of the lower shield layer; and
a second lead line which is electrically connected to the upper shield layer, wherein
when the upper shield layer is projected on a plane where the lower shield layer exists, the lead contact portion of the lower shield layer is provided in a position not overlapped by the upper shield layer, and sense current flows through the upper shield layer, the magnetoresistive sensor and the lower shield layer.

14. A magnetic disk drive, comprising:
a read/write head having a recording head for recording information on a magnetic disk and a reading head for detecting the information recorded on the magnetic disk;
a read/write circuit for sending and receiving a recording signal and a reproducing signal from or to the read/write head;
an actuator means which moves the read/write head to a predetermined position on the magnetic disk; and
a read/write operation control means for controlling the read/write circuit and the actuator means, wherein the read/write head includes a magnetic head comprising:
an upper shield layer;
a lower shield layer on which a lead contact portion is provided on the edge of the lower shield layer in a track width direction within a same plane, the lead contact portion having a height either being equal to or shorter than a maximum height of the lower shield layer in a stripe height direction;
a magnetoresistive sensor which is formed between the upper shield layer and the lower shield layer;
a first lead line which is electrically connected to the lead contact portion of the lower shield layer; and
a second lead line which is electrically connected to the upper shield layer, wherein
when the upper shield layer is projected on a plane where the lower shield layer exists, the lead contact portion of the lower shield layer is provided in a position not overlapped by the upper shield layer, and sense current flows through the upper shield layer, the magnetoresistive sensor and the lower shield layer.

15. A magnetic disk drive, comprising:
a read/write head having a recording head for recording information on a magnetic disk and a reading head for detecting the information recorded on the magnetic disk;
a read/write circuit for sending and receiving a recording signal and a reproducing signal from or to the read/write head;
an actuator means which moves the read/write head to a predetermined position on the magnetic disk; and
a read/write operation control means for controlling the read/write circuit and the actuator means, wherein the read/write head includes a magnetic head comprising:
an upper shield layer;
a lower shield layer;
a magnetoresistive sensor formed between the upper shield layer and the lower shield layer;
a first lead line electrically connected to the lower shield layer;
a second lead line electrically connected to the upper shield layer, and a sense current flows through the upper shield layer, the magnetoresistive sensor and the lower shield layer, wherein
the lower shield layer has a lower lead contact portion within a same plane, the lower lead contact portion is positioned so as not to be overlapped by the upper shield layer, when the upper shield layer is projected on the plane where the lower shield layer exists, and the first lead line is connected to the lower lead contact portion.

16. A magnetic disk drive according to claim 15, wherein the lower lead contact portion is formed in approximately convex shape on an opposite side of an air bearing surface in the stripe height direction on the lower shield layer.

17. A magnetic disk drive according to claim 16, wherein the upper shield layer has an upper lead contact portion of approximately convex shape within a same plane.

18. A magnetic disk drive according to claim 17, wherein the upper lead contact portion is formed on an opposite side of the air bearing surface in the stripe height direction on the upper shield layer.

19. A magnetic disk drive according to claim 17, wherein the upper lead contact portion is formed on at least one edge in the track width direction on the upper shield layer.

20. A magnetic disk drive according to claim 15, wherein the lower lead contact portion is formed in approximately convex shape on at least one edge in the track width direction on the lower shield layer.

21. A magnetic disk drive according to claim 20, wherein the upper shield layer has an upper lead contact portion of approximately convex shape within a same plane.

22. A magnetic disk drive according to claim 21, wherein the upper lead contact portion is formed on an opposite side of an air bearing surface in the stripe height direction on the upper shield layer.

23. A magnetic disk drive according to claim 21, wherein the upper lead contact portion is formed on at least one edge in the track width direction on the upper shield layer.

* * * * *